Jan. 28, 1964     L. W. KIMES ETAL     3,119,533
BALL STORING ACCESSORY FOR GOLF CARTS OR THE LIKE
Filed Aug. 5, 1960
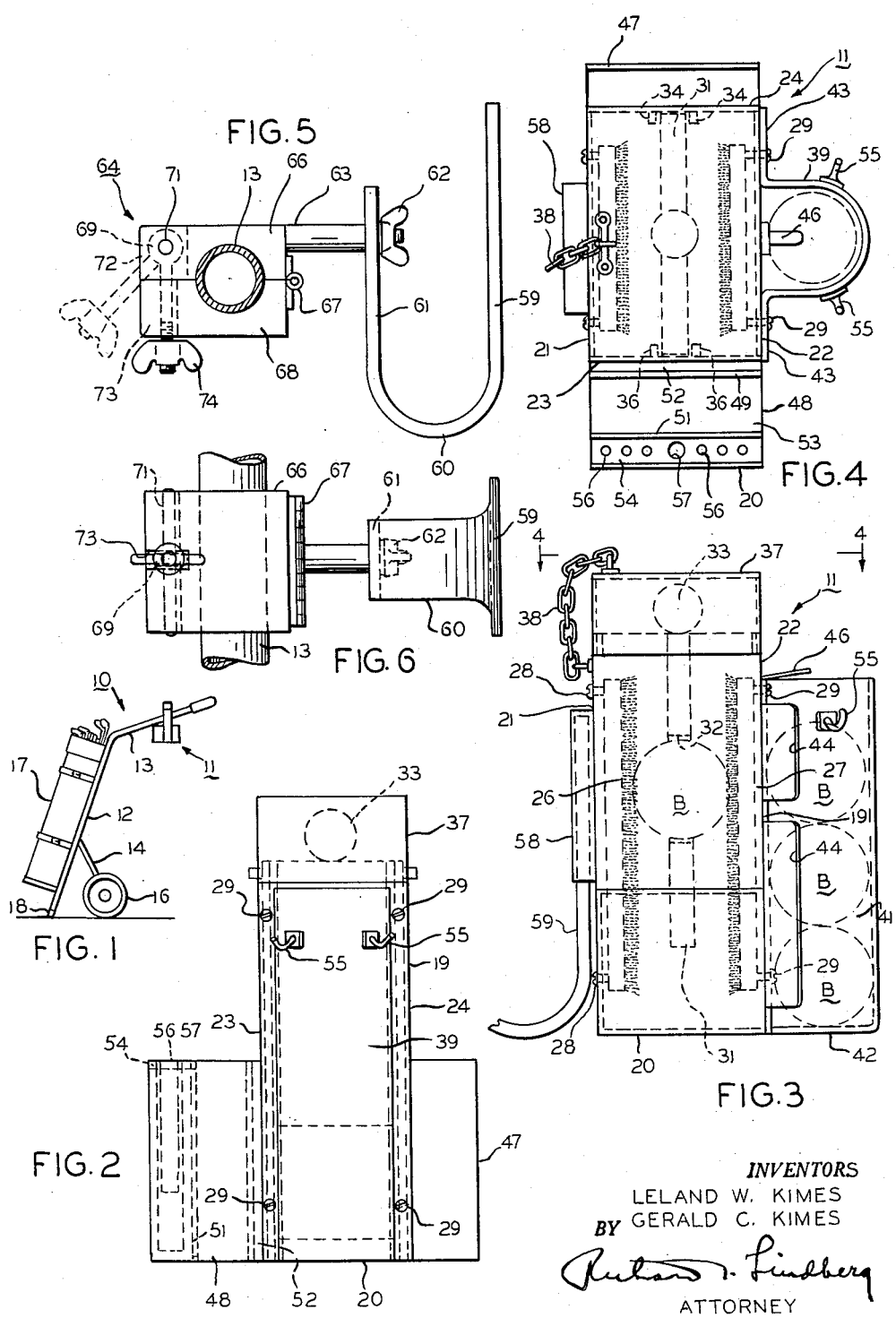
INVENTORS
LELAND W. KIMES
GERALD C. KIMES
BY
ATTORNEY 3,119,533
BALL STORING ACCESSORY FOR GOLF CARTS OR THE LIKE
Leland W. Kimes, 8734 S. Honore, and Gerald C. Kimes, 8021 S. Drexel, both of Chicago, Ill.
Filed Aug. 5, 1960, Ser. No. 47,730
1 Claim. (Cl. 224—29)

This invention relates generally to golfing equipment, and more particularly to a golf accessory adapted to be supported upon a golfer's cart and adapted thereby to assist the golfer.

One of the principal objects of this invention is to provide the combination with a golfer's cart of an accessory adapted to be mounted upon the tow bar of such golf cart, said accessory including structure for storing a number of golf balls which may be readily removed for use by the golfer, said accessory being adapted to be mounted in such a fashion that the accessory is in a position for use when the cart is at rest.

Other important objects of the invention will be apparent from a study of the specification following taken with the drawing, which together describe and illustrate a preferred embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claim.

In the drawing:

FIG. 1 is a side elevational view of a golf cart shown in combination with an accessory forming a part of the present invention;

FIG. 2 is an elevational view of a golfer's accessory according to the present invention;

FIG. 3 is a side view thereof, certain parts being shown in section more clearly to show details;

FIG. 4 is a plan view, certain parts being shown in hidden outline, more clearly to show details;

FIG. 5 is an elevational view of structure for securing the accessory shown in FIGS. 2 to 4 inclusive to the tow bar of a golf cart or the like; and FIG. 6 is a plan view thereof.

Referring now to the drawing, the improved combination of a golfer's cart and accessory therefor is referred to generally by the reference numeral 10, the accessory being especially denoted by the reference numeral 11 and secured as will be described to a golfer's cart indicated generally by the reference numeral 12. The cart 12 includes a tow bar 13 and a frame 14, frame 14 having spaced ground engaging wheels 16. The cart 12 supports a bag 17 of golf clubs, and cart 12 also includes feet 18 adapted to engage the ground when the cart 12 is at rest.

The accessory 11 includes a receptacle indicated generally by the reference numeral 19 with spaced side walls 21 and 22, spaced end walls 23 and 24 and a bottom 20. The spaced side walls 21 and 22 are adapted to support on the inside confronting faces thereof spaced brushes 26 and 27, brush 26 being secured to side wall 21 by a plurality of screws 28 threaded into each brush. Brush 27 is similarly supported on its side wall 22 by means of screws 29.

The receptacle 19 is adapted to enclose a quantity of cleaning liquid and suitable gasket type washers are provided for the screws 28 and 29 to prevent leakage from the receptacle 19.

Structure is provided for supporting a golf ball B adapted to be cleaned by the brushes 26 and 27 and by the cleaning solution held within the receptacle 19. Such structure comprises a generally flat paddle 31 having an opening 32 therein for the ball B shown. The paddle 31 has an upper handle 33, and the paddle 31 is adapted to be moved up and down in a vertical direction to clean the ball. Paddle 31 is held between spaced guides 34 in end wall 24 and similar guides 36 on the inner face of end wall 23.

A closure indicated generally by the reference numeral 37 is adapted to fit over the receptacle 19 so as to prevent the spillage of cleaning fluid therefrom when the cart 12 is being towed over the course. The closure 37 is connected by a chain 38 to the side wall 21 of the receptacle 19 so as to prevent its loss.

Structure is provided for supporting the plurality of balls B and is referred to generally by the reference numeral 39. The structure 39 comprises a rack 41 having a bottom closure 42. The rack 41 is of generally cylindrical construction, and has ears 43 extending therefrom which together with the screws 29, 29 enable the rack 41 to be held to the side wall 22.

The rack 41 has a plurality of openings 44 therein for enabling the golfer to push a ball B out the top thereof and in order to prevent the unintended removal of the ball from the rack 39, a spring finger 46 is secured in any convenient fashion to the side wall 22, the spring finger 46 extending over the topmost ball B.

In a preferred embodiment of the invention, the end wall 24 affords a means of securing a receptacle 47 of a dimension to hold a package of cigarettes or the like. Likewise the end wall 23 affords a means of supporting a suitable receptacle 48 comprising spaced partitions 49 and 51. End wall 23 and partition 49 define a receptacle 52 for a golfer's score card or the like, and partitions 49 and 51 define a receptacle 53 for hand lotion or sun lotion or the like. A suitable rack 54 is mounted on the receptacle 48 and has openings 56 therein for tees and an opening 57 for a pencil or the like.

The rack 41 has hooks 55 extending therefrom for securing a hand towel thereto.

Structure is provided for supporting the golfer's accessory 11 to the tow bar 13, see particularly FIGS. 5 and 6. Accordingly, the wall 21 of the receptacle 19 has a clip 58 which is adapted to be supported on a tongue 59 forming part of a U-shaped support 60 as seen more particularly in FIG. 5. The U-shaped support 60 also comprises a vertical arm 61 held by a wing nut and screw 62 to an arm 63 of a clamping structure indicated generally by the reference numeral 64 adapted to be clamped to the tow bar 13.

The structure 64 includes an upper clamping block 66 connected to a hinge 67 in turn connected to a lower clamping block 68. A wing bolt 69 is connected by a pin 71 to the upper block 66, and the wing bolt 69 swings within a slot 72 in the upper block 66 and a similar slot 73 formed in the lower block 68. The wing bolt 69 has a wing nut 74 thereon adapted to move into engagement with the lower clamping block 68 to thereby clamp the clamping structure 64 firmly to the tow bar 13.

It will be seen that the clamping structure 64 affords a means for adjusting the position of the accessory 11 in two different planes, so that the accessory 11 is generally in a vertical plane parallel to the plane passing through the cart 12. The clamping structure 64 is preferably arranged so that the wing nut 62 can be adjusted to maintain the receptacle 11 in a vertical plane when the cart is at rest and when the golfer desires to use the accessory 11.

From the description foregoing, it is believed evident that there has been provided a new and useful improvement in the art of accessories for golfers or the like. While the invention has been described in terms of a preferred embodiment thereof, its scope is intended to be limited only by the claim here appended.

We claim:

A golfer's accessory adapted to be mounted on the tow bar of a golf cart or the like, said accessory comprising means for storing a quantity of golf balls including a substantially vertically extending rack of essentially circular cross section including means for securing said rack to the tow bar of said golf cart, a bottom closure for said rack, a plurality of opposed openings in the side of said rack extending substantially for the length thereof, said openings enabling the user of said rack to view readily the number of balls within said rack, and to engage readily a ball within said rack and to move the same to the top of the rack for removal of the ball from said rack, and means comprising a spring member disposed in overlying relationship to the top of said rack for preventing the unintended removal of a ball from said rack, said spring member being yieldable to enable a ball to be removed from said rack against the bias of said spring.

References Cited in the file of this patent
UNITED STATES PATENTS

| | | |
|---|---|---|
| 1,589,839 | Conklin | June 22, 1926 |
| 1,810,491 | McClure | June 16, 1931 |
| 1,918,529 | Frater | July 18, 1933 |
| 2,024,484 | Smith | Dec. 17, 1935 |
| 2,617,132 | Goller | Nov. 11, 1952 |
| 2,782,971 | Hershey | Feb. 26, 1957 |
| 2,822,558 | Vandervort et al. | Feb. 11, 1958 |
| 2,950,748 | Olinghouse | Aug. 30, 1960 |
| 2,966,280 | Nelson | Dec. 27, 1960 |